United States Patent
Tsai et al.

(10) Patent No.: US 8,102,650 B2
(45) Date of Patent: Jan. 24, 2012

(54) ELECTRONIC DEVICE

(75) Inventors: Wen-Ji Tsai, Taipei County (TW);
Bo-Ren Yan, Taichung County (TW);
Tsung-Yu Wu, Taipei County (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 311 days.

(21) Appl. No.: 12/623,519

(22) Filed: Nov. 23, 2009

(65) Prior Publication Data

US 2011/0051361 A1      Mar. 3, 2011

(30) Foreign Application Priority Data

Aug. 25, 2009   (TW) ................................ 98215659 U

(51) Int. Cl.
*G06F 1/16*      (2006.01)
(52) U.S. Cl. .................................................. 361/679.55
(58) Field of Classification Search ............. 361/679.01, 361/679.55
See application file for complete search history.

(56) References Cited

U.S. PATENT DOCUMENTS

| | | | | |
|---|---|---|---|---|
| 5,255,214 A * | 10/1993 | Ma | ............................ | 361/679.55 |
| 6,498,718 B1 * | 12/2002 | Kim et al. | ................. | 361/679.55 |
| 6,859,357 B2 * | 2/2005 | Morimoto et al. | ........ | 361/679.55 |
| 7,126,816 B2 * | 10/2006 | Krah | ......................... | 361/679.55 |
| 7,400,498 B2 * | 7/2008 | Liang et al. | .............. | 361/679.55 |
| 7,894,197 B2 * | 2/2011 | Hwang et al. | ................. | 361/752 |
| 2009/0257182 A1 * | 10/2009 | Yang | ........................ | 361/679.01 |
| 2010/0194711 A1 * | 8/2010 | Tsai et al. | ..................... | 345/175 |
| 2010/0309144 A1 * | 12/2010 | Tsai et al. | ..................... | 345/173 |
| 2011/0050641 A1 * | 3/2011 | Tsai et al. | ..................... | 345/175 |

* cited by examiner

*Primary Examiner* — Lisa Lea Edmonds
(74) *Attorney, Agent, or Firm* — Thomas|Kayden

(57) ABSTRACT

An electronic device is provided, including a first body, a second body, an axle assembly, a supporting frame, a display panel, a lens unit and a reflective unit. The second body is connected to the first body. The axle assembly is disposed between the first body and the second body, and via which first body is rotatable relative to the second body. The supporting frame is disposed in the second body and connected to the axle assembly, wherein the supporting frame is rotated with the rotation of the axle assembly. The display panel is fastened in the supporting frame. The lens unit is disposed on an end of the supporting frame. The reflective unit is disposed on the supporting frame and adjacent to the display panel.

20 Claims, 6 Drawing Sheets

ELECTRONIC DEVICE

This Application claims priority of Taiwan Patent Application No. 098215659, filed on Aug. 25, 2009, the entirety of which is incorporated by reference herein.

BACKGROUND OF THE INVENTION

1. Field of the Invention

The invention relates to an electronic device, and in particular, to a portable electronic device comprising an optical touch panel.

2. Description of the Related Art

An optical touch panel of the display module is operated by detecting the light beam reflected by the reflective strip via the optical sensor, wherein a pressed location by a user on the display panel can be calculated. The display panel may be deformed and curved by the touch (or press) of a user or an external force, causing the optical sensor and the reflective strip to relatively shift due to that the optical sensor and the reflective strip are both adhered on the display panel in a conventional portable computer. In other words, the optical sensor and the reflective strip cannot stay on the same horizontal level, wherein the optical sensor may not stably receive the light beam reflected by the reflective strip. Therefore, in such a case, the system is not able to determine the correct location pressed by the user on the display panel, resulting in an inaccurate determination and causing noises and disturbance.

BRIEF SUMMARY OF THE INVENTION

An electronic device is provided, comprising a first body, a second body, an axle assembly, a supporting frame, a display panel, a lens unit and a reflective unit. The second body is connected to the first body. The axle assembly is disposed between the first body and the second body, and via which the first body is rotatable relative to the second body. The supporting frame is disposed in the second body and connected to the axle assembly, wherein the supporting frame is rotated with the rotation of the axle assembly. The display panel is fastened in the supporting frame. The lens unit is disposed on an end of the supporting frame. The reflective unit is disposed on the supporting frame and adjacent to the display panel.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
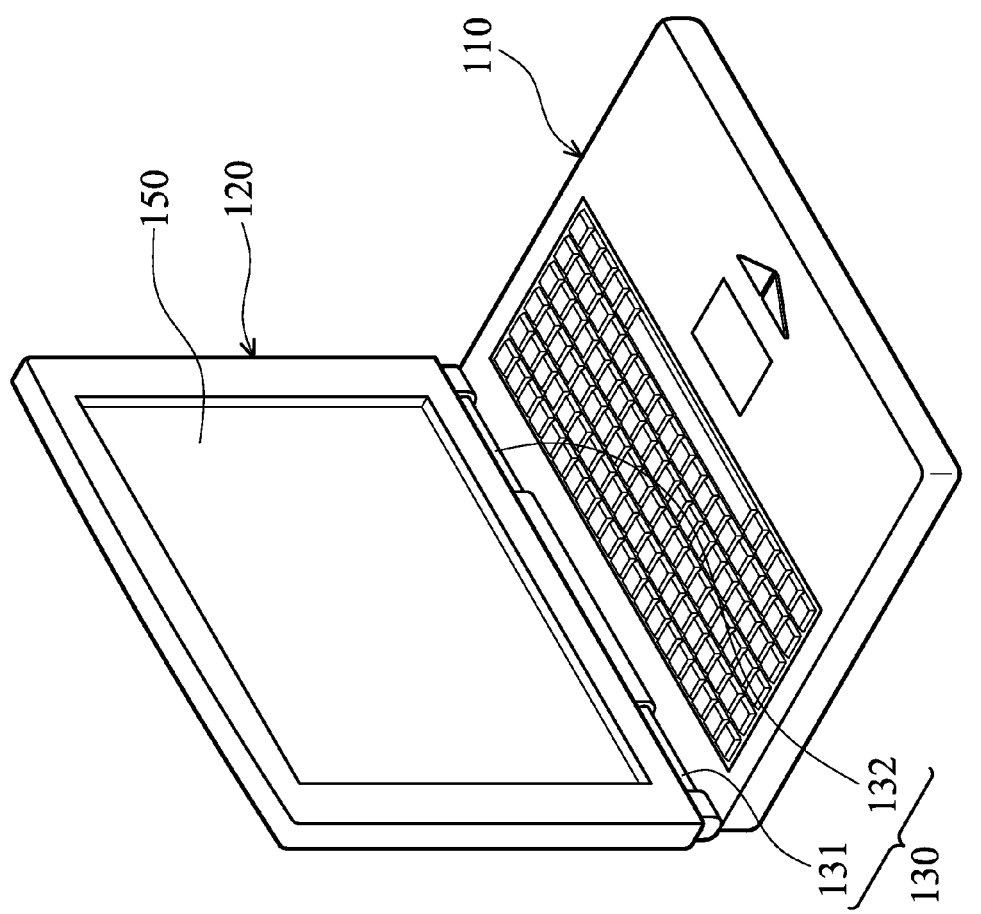
FIG. 1 is a schematic view of an electronic device of the invention.

As shown in FIG. 1, the electronic device 100 of the invention is a portable computer, comprising a first body 110, a second body 120 and an axle assembly 130. The first body 110 is assembled with an input device, such as a keyboard, a touch pad or a touch point, and the second body 120 is assembled with an optical touch panel module. The axle assembly 130 comprises a first axle 131 and a second axle 132. The first body 110 is connected with the second body 120 via the fist axle 131 and the second axle 132, and relative rotation between the first body 110 and the second body 120 is achieved.

Figure 2:
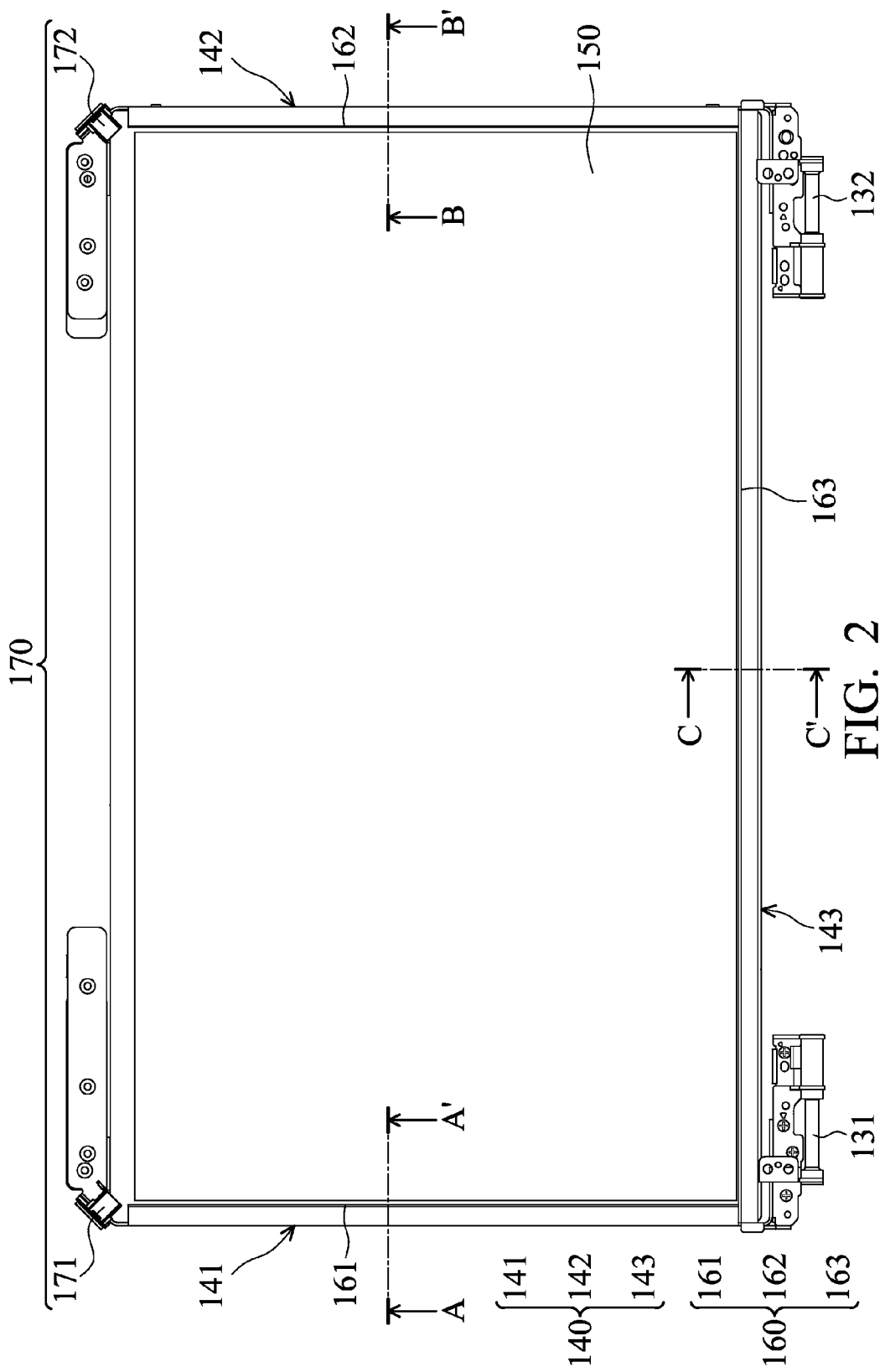
FIG. 2 is a schematic view showing a supporting frame, an axle assembly, a display panel and lens modules of the electronic device of the invention.

As shown in FIG. 2, the second body 120 further comprises a supporting frame 140, a display panel 150, a reflective unit 160 and a lens unit 170, wherein the supporting frame 140, the display panel 150, the reflective unit 160 and the lens unit 170 together make up the optical touch panel module within the electronic device 100.

The supporting frame 140, disposed in the second body 120, comprises a first supporting member 141, a second supporting member 142 and a third supporting member 143. The first supporting member 141 connects with the first axle 131, the second supporting member 142 connects with the second axle 132, and the third supporting member 143 connects the first supporting member 141 with the second supporting member 142. The reflective unit 160 comprises a first reflective strip 161, a second reflective strip 162 and a third reflective strip 163, disposed on the first supporting member 141, the second supporting member 142 and the third supporting member 143, respectively. In an embodiment, the lens unit 170 comprises a first lens module 171 and a second lens module 172, disposed on adjacent corners of the display panel 150. In addition, the edge between the first lens module 171 and the second lens module 172 is opposite and corresponding to the third supporting member 143. In an embodiment, the first supporting member 141, the second supporting member 142 and the third supporting member 143 are integrally formed as a single piece.

Figure 3A:
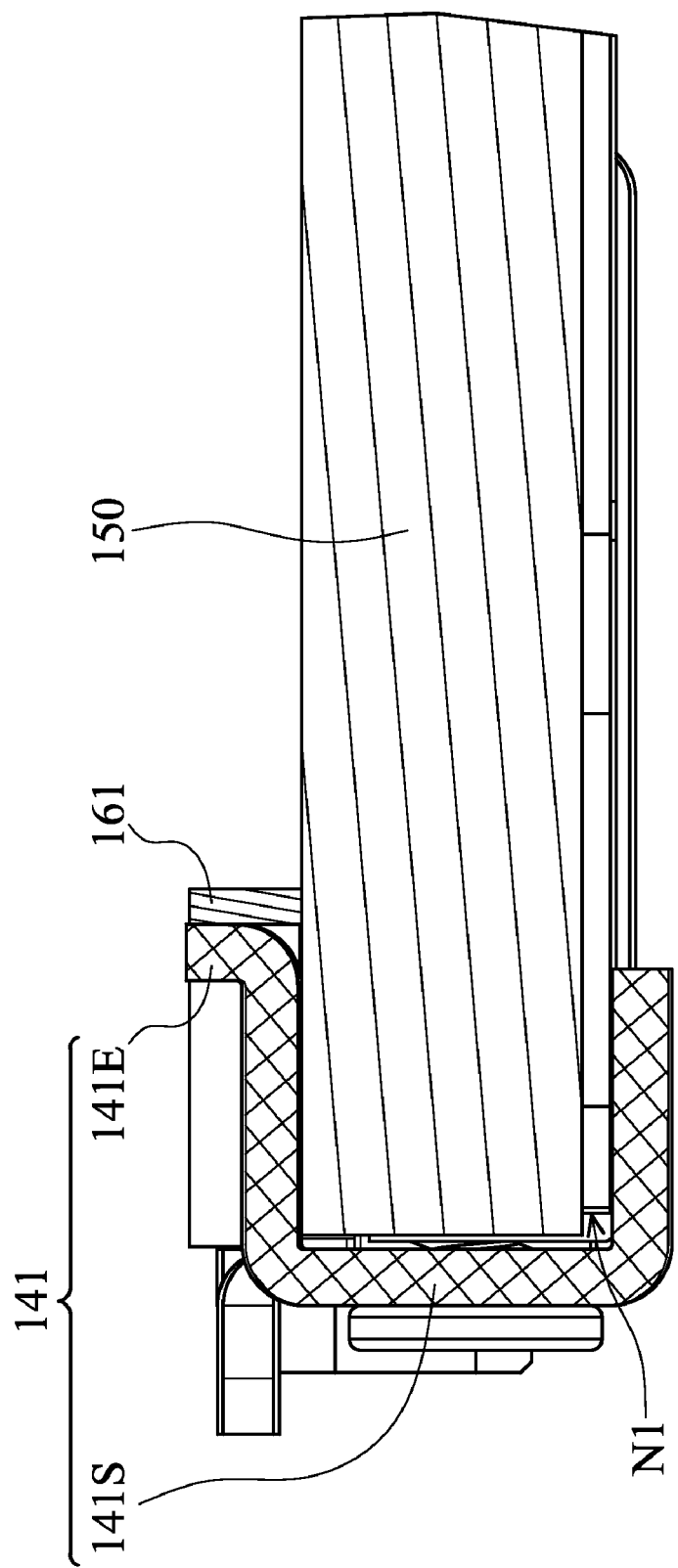
FIG. 3A is a sectional view cut along line A-A' in FIG. 2.

Referring to FIG. 3A, FIG. 3A depicts a sectional view of the first supporting member 141 (i.e. along line A-A' in FIG. 2). The first supporting member 141 comprises a first main portion 141S and a first extending portion 141E. The first main portion 141S is U-shaped and has a first notch N1 to engage with the edge of the display panel 150. The first extending portion 141E is extended upwardly from the first main portion 141S and an angle is formed therebetween. The first reflective strip 141 is disposed on the first extending portion 141E and adjacent to the display panel 150. In an embodiment, the first extending portion 141E is substantially perpendicular to the first main portion 141S.

Figure 3B:
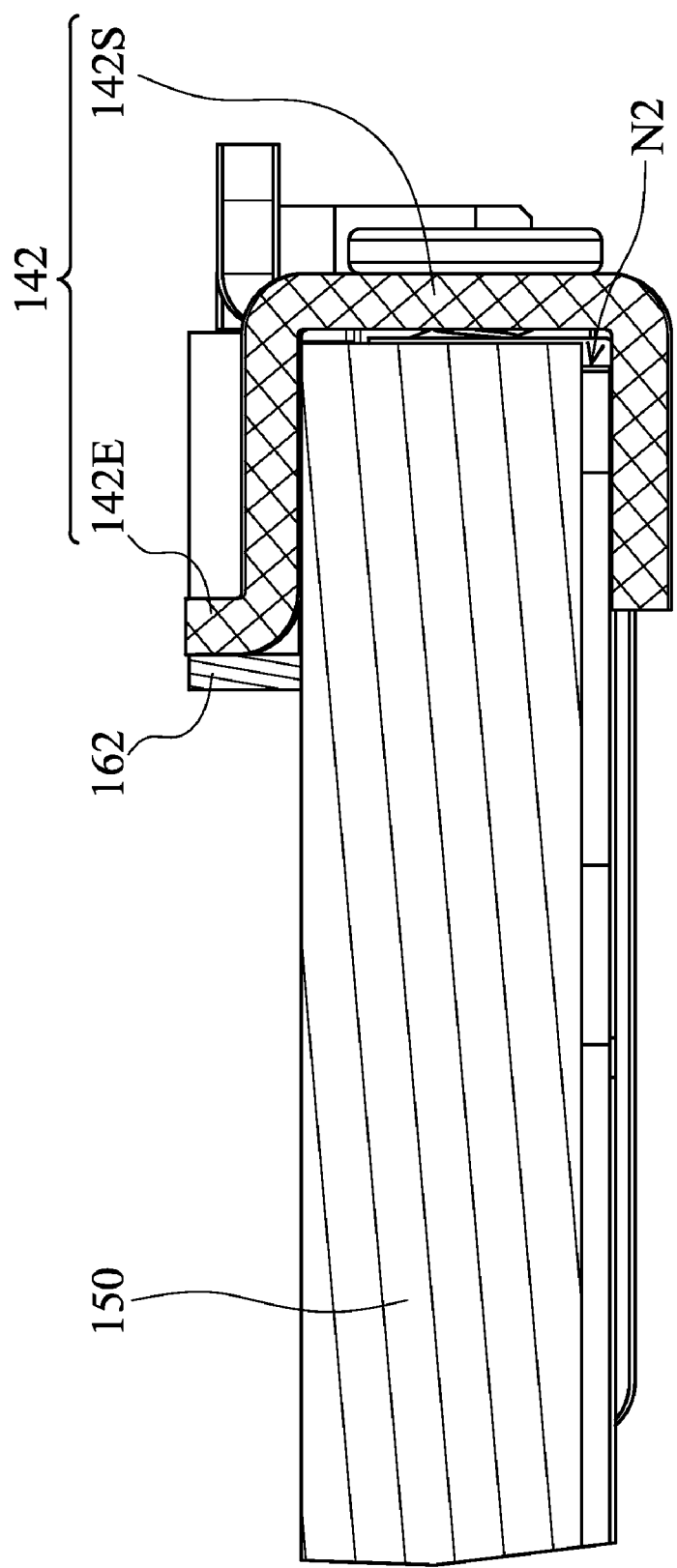
FIG. 3B is a sectional view cut along line B-B' in FIG. 2.

Referring to FIG. 3B, FIG. 3B depicts a sectional view of the second supporting member 142, (i.e. along line B-B' in FIG. 2). The second supporting member 142 comprises a second main portion 142S and a second extending portion 142E. The second main portion 142S is U-shaped and has a second notch N2 to engage with the edge of the display panel 150. The second extending portion 142E is extended upwardly from the second main portion 142S and an angle is formed therebetween. The second reflective strip 142 is disposed on the second extending portion 142E and adjacent to the display panel 150. In an embodiment, the second extending portion 142E is substantially perpendicular to the second main portion 142S.

Figure 3C:
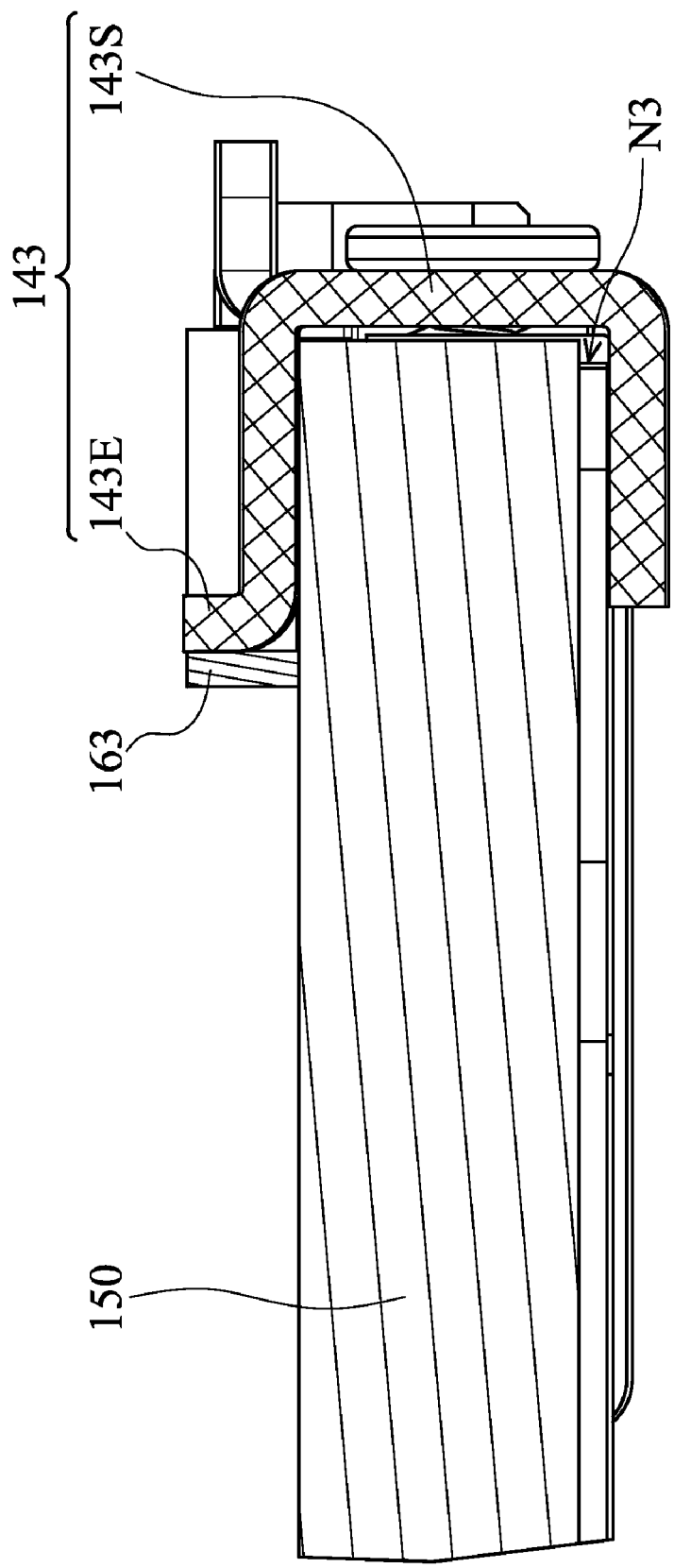
FIG. 3C is a sectional view cut along line C-C' in FIG. 2.

Referring to FIG. 3C, FIG. 3C depicts a sectional view of the third supporting member 143, (i.e. along line C-C' in FIG. 2). The third supporting member 143 comprises a third main portion 143S and a third extending portion 143E. The third main portion 143S is U-shaped and has a third notch N3 to engage with the edge of the display panel 150. The third extending portion 143E is extended upwardly from the third main portion 143S and an angle is formed therebetween. The third reflective strip 143 is disposed on the third extending portion 143E and adjacent to the display panel 150. In an embodiment, the third extending portion 143E is substantially perpendicular to the third main portion 143S.

Figure 4:
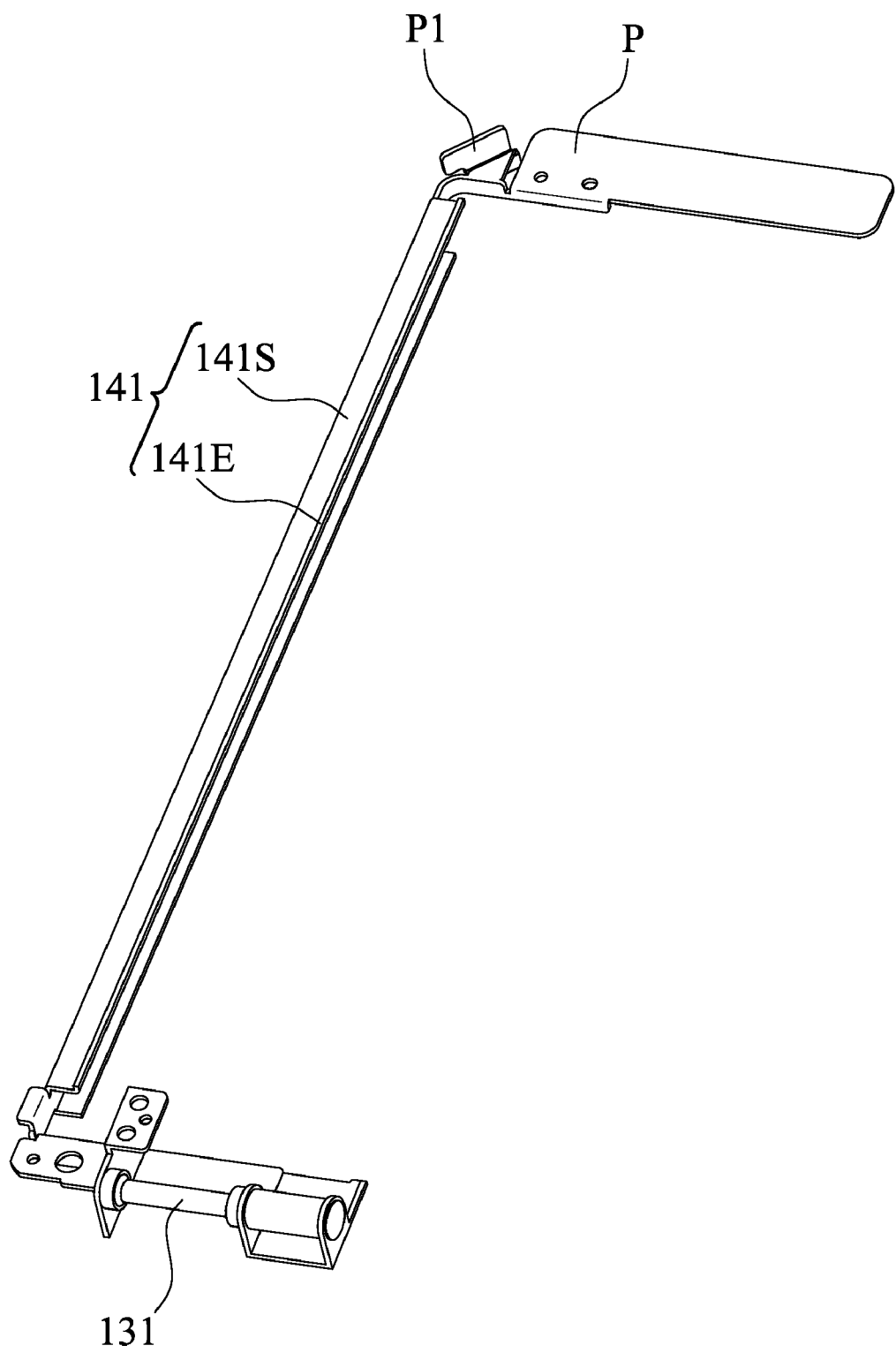
FIG. 4 is a schematic view showing a first axle and a first supporting member of the electronic device of the invention.

Referring to FIG. 2 and FIG. 4, FIG. 4 depicts a clearer view of the first supporting member 141 and the first axle 131. The second supporting member 142 and the second axle 132 comprise the same structure as the first supporting member 141 and the first axle 131; however, they are symmetrically disposed on the opposite side of the electronic device 100. Parts of the first lens module 171 and the second lens module 172 are disposed on end portions P1 of the first supporting member 141 and the second supporting member 142, respectively. As a result, when the display panel 150 is clamped between the first supporting member 141 and the second supporting member 142, the first lens module 171 and the second lens module 172 are located on the top left corner and top right corner of the display panel 150, respectively.

Moreover, a detailed description of the first supporting member 141 is provided. Referring to FIG. 4, the first supporting member 141 further comprises a supporting pad P to receive other part of the first lens module 171. In detail, the end portion P1 is for disposition of the lens and the optical sensor of the lens unit 170, and the supporting pad P is for disposition of the circuit board of the lens unit 170 (as shown in FIG. 2). Thus, the thickness of lens unit 170 may be thinner. The supporting pad P is substantially perpendicular to the first main portion 141S, wherein the first lens module 171 (or the end portion P1) is at the corner formed by the supporting pad P and the first main portion 141S. The second supporting member 142 and the second lens module 172 are assembled in the same manner.

As shown in FIGS. 3A to 3C, the display panel 150 is clamped between the first main portion 141S, the second main portion 142S and the third main portion 143S. In detail, the different side edges of the display panel 150 respectively engages with the first notch N1, the second notch N2 and the third notch N3. When the user presses the display panel 150, the display panel 150 would not be deformed due to the both surfaces of the display panel 150 being tightly fastened by the three notches N1, N2 and N3. In other words, whether the user touches the display panel 150 or not, the lens unit 170 and the reflective strips 161, 162 and 163 are always on the same horizontal level to assure that the lens unit 170 could receive the light beam from the reflective strip 161, 162 or 163, and further accurately determines the touched location. In detail, before the user touches the display panel 150, the lens unit 170 and the reflective strips 161, 162 and 163 are located on a first horizontal level, and after the user touches the display panel 150, the lens unit 170 and the reflective strips 161, 162 and 163 are on a second horizontal level. The first horizontal level may be the same as the second horizontal level when the axle assembly 130 is not rotated, or the first horizontal level may be different from the second horizontal level when the axle assembly 130 is rotated to generate relative rotation between the first body 110 and the second body 120.

In one embodiment, the supporting frame 140 only comprise the first supporting member 141 and the second supporting member 142, for avoiding from deforming, to clamp the opposite side edges of the display panel 150.

In the electronic device 100 of the invention, the supporting frame 140 can prevent the display panel 150 from deformation, and the lens unit 170 and the reflective unit 160 could be directly disposed on the supporting frame 140 to save assembly steps and time.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a first body;
a second body, connected to the first body;
an axle assembly, disposed between the first body and the second body, and via which the first body is rotatable relative to the second body;
a supporting frame, disposed in the second body and connected to the axle assembly, wherein the supporting frame is rotated with the axle assembly;
a display panel, fastened in the supporting frame;
a lens unit, disposed on an end of the supporting frame; and
a reflective unit, disposed on the supporting frame and adjacent to the display panel.

2. The electronic device as claimed in claim 1, wherein the supporting frame comprises a first supporting member and a second supporting member, the axle assembly comprises a first axle and a second axle, and the first supporting member and the second supporting member respectively connect with the first axle and the second axle.

3. The electronic device as claimed in claim 2, wherein the first supporting member comprises a first main portion and a first extending portion, the first extending portion is extended upwardly from the first main portion, and the second supporting member comprises a second main portion and a second extending portion, and the second extending portion is extended upwardly from the second main portion.

4. The electronic device as claimed in claim 3, wherein the first main portion has a first notch and the second main portion has a second notch, and the display panel is clamped between the first notch and the second notch.

5. The electronic device as claimed in claim 4, wherein edges of the display panel engages with the first notch and the second notch.

6. The electronic device as claimed in claim 3, wherein the reflective unit further comprises a first reflective strip and a second reflective strip, disposed on the first extending portion and the second extending portion, respectively.

7. The electronic device as claimed in claim 3, wherein the first extending portion is substantially perpendicular to the first main portion, and the second extending portion is substantially perpendicular to the second main portion.

8. The electronic device as claimed in claim 2, wherein the lens unit further comprises a first lens module and a second lens module, disposed on end portions of the first supporting member and the second supporting member, respectively.

9. The electronic device as claimed in claim 8, wherein the first supporting member and the second supporting member respectively comprise a supporting pad to receive a circuit board of the first lens module and a circuit board of the second lens module.

10. The electronic device as claimed in claim 9, wherein the supporting pads are substantially perpendicular to the first main portion and the second main portion respectively, and the end portions are located on a corner formed by the supporting pad of the first supporting member and first main portion, and a corner formed by the supporting pad of the second supporting member and the second main portion, respectively.

11. The electronic device as claimed in claim 3, wherein the supporting frame further comprises a third supporting member connecting the first supporting member with the second supporting member, and the third supporting member comprises a third main portion and a third extending portion, and the third extending portion is extended upwardly from the third main portion.

12. The electronic device as claimed in claim 11, wherein the first main portion has a first notch, the second main portion has a second notch, the third main portion has a third notch, and the display panel is clamped between the first notch, the second notch and the third notch.

13. The electronic device as claimed in claim 12, wherein the edges of the display panel engages with the first notch, the second notch and the third notch.

14. The electronic device as claimed in claim 11, wherein the reflective unit further comprises a first reflective strip, a second reflective strip and a third reflective strip, and the first reflective strip, the second reflective strip and the third reflective strip are disposed on the first extending portion, the second extending portion and the third extending portion, respectively.

15. The electronic device as claimed in claim 11, wherein the first supporting member, the second supporting member and the third supporting member are integrally formed as a single piece.

16. The electronic device as claimed in claim 15, wherein the lens unit further comprises a first lens module and a second lens module, disposed on end portions of the first supporting member and the second supporting member, respectively.

17. The electronic device as claimed in claim 16, wherein the first supporting member and the second supporting member respectively comprise a supporting pad to receive a circuit board of the first lens module and a circuit board of the second lens module.

18. The electronic device as claimed in claim 17, wherein the supporting pads are substantially perpendicular to the first main portion and the second main portion respectively, and the end portions are located on a corner formed by the supporting pad of the first supporting member and first main portion, and a corner formed by the supporting pad and of the second supporting member the second main portion, respectively.

19. The electronic device as claimed in claim 1, further comprising an input device disposed on the first body.

20. The electronic device as claimed in claim 1, wherein the electronic device is a portable computer.

\* \* \* \* \*